United States Patent
Beck et al.

(10) Patent No.: US 10,408,305 B2
(45) Date of Patent: Sep. 10, 2019

(54) TRANSMISSION DEVICE HAVING A TRANSMISSION INPUT SHAFT, HAVING A TRANSMISSION OUTPUT SHAFT AND HAVING THREE PLANETARY GEAR SETS

(71) Applicant: ZF Friedrichshafen AG, Friedrichshafen (DE)

(72) Inventors: Stefan Beck, Eriskirch (DE); Martin Brehmer, Tettnang (DE); Matthias Horn, Tettnang (DE); Johannes Kaltenbach, Friedrichshafen (DE); Julian King, Rankweil (AT); Bernd Knöpke, Salem (DE); Jens Moraw, Friedrichshafen (DE); Eckehard Münch, Bünde (DE); Gerhard Niederbrucker, Friedrichshafen (DE); Juri Pawlakowitsch, Kressbronn (DE); Stephan Scharr, Friedrichshafen (DE); Viktor Warth, Friedrichshafen (DE); Michael Wechs, Weißensberg (DE); Peter Ziemer, Tettnang (DE); Uwe Griesmeier, Markdorf (DE); Raffael Kuberczyk, Ravensburg (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 103 days.

(21) Appl. No.: 15/576,046

(22) PCT Filed: Apr. 27, 2016

(86) PCT No.: PCT/EP2016/059335
§ 371 (c)(1),
(2) Date: Nov. 21, 2017

(87) PCT Pub. No.: WO2016/188695
PCT Pub. Date: Dec. 1, 2016

(65) Prior Publication Data
US 2018/0156315 A1 Jun. 7, 2018

(30) Foreign Application Priority Data

May 27, 2015 (DE) .................... 10 2015 209 647

(51) Int. Cl.
*F16H 3/66* (2006.01)
*B60K 6/365* (2007.10)
(Continued)

(52) U.S. Cl.
CPC ............... *F16H 3/66* (2013.01); *B60K 6/365* (2013.01); *B60K 6/48* (2013.01); *B60K 6/547* (2013.01);
(Continued)

(58) Field of Classification Search
CPC . F16H 3/66; F16H 3/724; F16H 3/666; F16H 2003/445; F16H 2200/2094;
(Continued)

(56) References Cited

U.S. PATENT DOCUMENTS

| 7,341,537 | B2 | 3/2008 | Klemen | |
| 7,416,507 | B1* | 8/2008 | Carey | F16H 3/66 |
| | | | | 475/275 |

(Continued)

FOREIGN PATENT DOCUMENTS

| DE | 10302023 A1 | 7/2004 |
| DE | 102005014592 A1 | 10/2006 |

(Continued)

OTHER PUBLICATIONS

German Search Report DE102015209647.5, dated Feb. 19, 2016. (9 pages).

(Continued)

*Primary Examiner* — David J Hlavka
(74) *Attorney, Agent, or Firm* — Dority & Manning, P.A.

(57) ABSTRACT

A transmission system (1) including a transmission input shaft (2), a transmission output shaft (3), and three planetary (Continued)

gear sets (P1, P2, P3) having a total of seven interface shafts (W1-W7). The planetary gear sets (P1, P2, P3) are at least partially functionally connected to each other by planetary gear set shafts (S1-HR3), are at least partially connectable to each other through a plurality of shift elements (B1, B2, K1-K3; B1-B3, K1-K3), and are coupled to the seven interface shafts (W1-W7) by the planetary gear set shafts (S1-HR3) such that at least six gear ratios (1VM-6VM, R1VM, R2VM) are selectable such that the transmission input shaft (2) and the transmission output shaft (3) revolve with the same or different direction of rotation.

11 Claims, 14 Drawing Sheets

(51) Int. Cl.
| | | |
|---|---|---|
| *B60K 6/48* | (2007.10) | |
| *B60K 6/547* | (2007.10) | |
| *F16H 3/72* | (2006.01) | |
| B60K 6/54 | (2007.10) | |
| F16H 3/44 | (2006.01) | |

(52) U.S. Cl.
CPC ............ *F16H 3/666* (2013.01); *F16H 3/724* (2013.01); *B60K 2006/4816* (2013.01); *B60K 2006/541* (2013.01); *B60Y 2200/92* (2013.01); *F16H 2003/445* (2013.01); *F16H 2200/0052* (2013.01); *F16H 2200/0086* (2013.01); *F16H 2200/201* (2013.01); *F16H 2200/2043* (2013.01); *F16H 2200/2046* (2013.01); *F16H 2200/2064* (2013.01); *F16H 2200/2094* (2013.01); *F16H 2200/2097* (2013.01); *Y10S 903/911* (2013.01); *Y10S 903/919* (2013.01)

(58) Field of Classification Search
CPC ..... F16H 2200/2097; F16H 2200/2064; F16H 2200/2046; F16H 2200/2043; F16H 2200/201; F16H 2200/0086; F16H 2200/0052; B60K 6/365; B60K 6/547; B60K 6/48; B60K 2006/541; B60K 2006/4816; Y10S 903/919; Y10S 903/911; B60Y 2200/92
See application file for complete search history.

(56) References Cited

U.S. PATENT DOCUMENTS

| | | |
|---|---|---|
| 7,824,302 B2 | 11/2010 | Diosi et al. |
| 9,810,299 B2 | 11/2017 | Beck |
| 2004/0147360 A1 | 7/2004 | Gumpoltsberger |
| 2007/0207891 A1* | 9/2007 | Gumpoltsberger ....... F16H 3/66 475/280 |
| 2007/0216168 A1* | 9/2007 | Farano .................. D06F 37/302 292/89 |

FOREIGN PATENT DOCUMENTS

| | | |
|---|---|---|
| DE | 102006024442 A1 | 11/2006 |
| DE | 102012207028 A1 | 10/2013 |
| DE | 102012219733 A1 | 4/2014 |
| FR | 2885667 A1 | 11/2006 |
| JP | 2000310300 A | 11/2000 |

OTHER PUBLICATIONS

International Search Report (English Translation) PCT/EP2016/059335, dated Jun. 28, 2016. (2 pages).

* cited by examiner

|     | B1 | B2 | B3 | K1 | K2 | K3 |
|-----|----|----|----|----|----|----|
| 1VM | x  |    |    |    | x  |    |
| 2VM | x  |    |    |    |    | x  |
| 3VM | x  |    |    | x  |    |    |
| 4VM |    |    |    | x  |    | x  |
| 5VM |    |    |    | x  | x  |    |
| 6VM |    | x  |    | x  |    |    |
| R1VM|    |    | x  |    | x  |    |
| R2VM|    |    | x  |    |    | x  |

Fig. 3

|     | B1 | B2 | K1 | K2 | K3 |
|-----|----|----|----|----|----|
| VM1 | x  |    |    | x  |    |
| VM2 | x  |    |    |    | x  |
| VM3 | x  |    | x  |    |    |
| VM4 |    |    | x  |    | x  |
| VM5 |    | x  | x  | x  |    |
| VM6 |    |    | x  |    |    |

Fig. 14

TRANSMISSION DEVICE HAVING A TRANSMISSION INPUT SHAFT, HAVING A TRANSMISSION OUTPUT SHAFT AND HAVING THREE PLANETARY GEAR SETS

FIELD OF THE INVENTION

The invention relates generally to a transmission system with a transmission input shaft, with a transmission output shaft, and with three planetary gear sets as.

BACKGROUND

DE 10 2005 014 592 A1 shows an 8-speed transmission system configuration with a transmission input shaft, a transmission output shaft, and with four planetary gear sets. The four planetary gear sets in total include six so-called interface shafts and are at least partially functionally connected to each other in the area of planetary gear set shafts, e.g. ring gears, sun gears, and carriers, are least partially connectable to each other via five shift elements, and are coupled with the interface shafts in the area of the planetary gear set shafts for realizing eight gear ratios wherein the transmission input shaft and the transmission output shaft revolve with the same or different direction of rotation and represent so-called gear ratios for forward travel.

The known transmission concept of the transmission disadvantageously can only be adapted to various requirements with considerable design effort, which is inconsistent with a modular design concept to reduce the cost of manufacture.

Furthermore, during unfavorable load scenarios, high component loads and power losses that negatively impact efficiency occur in the known transmission systems.

SUMMARY OF THE INVENTION

Example aspects of the present invention provide a transmission characterized by low component loads and low power losses during operation, and that can be adjusted to various requirement profiles with low design effort.

The transmission according to the invention includes a transmission input shaft, a transmission output shaft, and three planetary gear sets with a total of seven interface shafts. For purposes of representing at least six gear ratios, wherein the transmission input shaft and the transmission output shaft revolve with the same or different direction of rotation and represent so-called gear ratios for forward travel when the transmission is used in a motor vehicle, the planetary gear sets are at least partially functionally connected to each other by planetary gear set shafts, e.g. ring gears, sun gears, and carriers, and are at least partially connectable to each other via shift elements, and are coupled with the interface shafts by the planetary gear set shafts.

The transmission system according to the invention furthermore features the configuration described as follows to place only a low load on the transmission components during operation, while at the same time generating low power losses during operation, wherein the latter advantage is achieved with favorable gear meshing efficiencies.

For this purpose, the first interface shaft of the planetary gear sets is connected rotationally fixedly to a first planetary gear set shaft of the first planetary gear set and to a housing-mated component, whereas the second interface shaft is connected to the transmission input shaft and the second planetary gear shaft of the first planetary gear set. In addition, the third interface shaft is connected to the transmission output shaft and to a second planetary gear set shaft of the third planetary gear set. In addition, the fourth interface shaft is connected to the third planetary gear set shaft of the first planetary gear set and is connectable to the seventh interface shaft with one of the shift elements, whereas the fifth interface shaft is connected to the third planetary gear set shaft of the second planetary gear set and to the first planetary gear set shaft of the third planetary gear set and is connectable to a housing-mated component with one of the shift elements. Furthermore, the sixth interface shaft is connected to the third planetary gear set shaft of the third planetary gear set and to the second planetary gear set shaft of the second planetary gear set and is connectable to the transmission input shaft with one of the shift elements, whereas the seventh interface shaft is connected to the first planetary gear set shaft of the second planetary gear set and is connectable to a housing-mated component with one of the shift elements and to the transmission input shaft with an additional shift element.

The inventive transmission structure of the transmission system is characterized by a simple design configuration with only three planetary gear sets, which additionally facilitates a manufacturing cost-reducing modular construction. By only employing one additional shift element, preferably a friction or form-locking brake, the transmission system is expandable with low design effort to make two additional gear ratios available in the area of the transmission system wherein the transmission input shaft and the transmission output shaft revolve with different or the same direction of rotation to facilitate so-called transmission ratios for reverse travel when a transmission system is used in a motor vehicle application. Furthermore, the option exists to easily configure the transmission system according to the invention as a hybrid transmission design, wherein an electrical machine required for this purpose merely needs to be integrated in the area of one of the interface shafts of the planetary gear sets.

On an easily engineered expanded embodiment of the transmission system according to the invention, the sixth interface shaft is connectable to a housing-mated component by an additional shift element in order to represent two transmission ratios for reverse travel.

When the transmission system according to the invention is used in a motor vehicle, the transmission input shaft is connected to a shaft of a drive unit, or is connectable thereto with a clutch, thus allowing mechanical power from the drive unit to be applied on the transmission input shaft. The drive unit can be a combustion engine, an electrical machine, or a combination of both. The transmission output shaft is an interface for transferring mechanical power to the drive wheels of the motor vehicle.

Hereinafter, a shaft, a planetary gear set shaft and an interface shaft are not strictly intended to refer to a, for example, cylindrical, rotating mechanical element for transferring torque, but these are rather intended to also refer to general interface elements that connect the individual components or elements to each other, particularly interface elements that connect several elements rotationally fixedly to each other.

A planetary gear set has a sun gear, a carrier and a ring gear. The planetary gears, which mesh with the gear teeth of the sun gear and/or with the gear teeth of the ring gear, are mounted rotatably on the carrier. Hereinafter, a minus or negative planetary gear set denotes a planetary gear set having a carrier, on which the planetary gears are mounted rotatably, including a sun gear and a ring gear. In this case the gear teeth of at least one of the planetary gears mesh with both the gear teeth of the sun gear and also with the gear teeth of the ring gear, so that the ring gear and the sun gear rotate in opposite directions of rotation when the sun gear rotates and the carrier is stationary.

Both the sun gear and the ring gear of a planetary gear set can also be split into several segments. It is for example conceivable that the planetary gears come with two sun gears that are not connected to each other. The rotational speed ratios are identical on both segments of the sun gear, as though they were connected to each other.

A distinction between a plus or positive planetary gear set and the just described minus planetary gear set is that the plus planetary gear set includes inner and outer planetary gear sets that are mounted rotatably on the carrier. In this case, the gear teeth of the inner planetary gears mesh with the gear teeth of the sun gear and with the gear teeth of the outer planetary gears. In addition, the gear teeth of the outer planetary gears mesh with the gear teeth of the ring gear. The result is that when the carrier is stationary, the ring gear and the sun gear rotate in the same direction of rotation.

The stationary gear ratio defines the rotational speed ratio between the sun gear and ring gear of a planetary gear set with a rotationally fixed carrier. Since the direction of rotation between the sun gear and the ring gear on a minus planetary gear set is inverse on a rotationally fixed carrier, the stationary gear ratio always assumes a negative value on a minus planetary gear set.

Depending on the actuation state, the shift elements permit a relative motion between two components, or establish a connection between the two components to transfer a torque. A relative motion for instance represents a rotation of two components, wherein the rotational speed of the first component and the rotational speed of the second component differ from each other. Moreover, the rotation of only one of the two components is also conceivable, whereas the other component remains stationary or rotates in the opposite direction.

Two elements are referred to as connected to each other or coupled to each other particularly when a fixed, specifically a rotationally fixed, connection exists between the elements. Elements connected and/or coupled to each other rotate with the same rotational speed. The various components and elements of the specified invention can in this case be connected to each other with a shaft and/or with a closed shift element or a connecting element, but also directly, for instance based on a welded, pressed, or other connection.

Hereinafter, two elements are referred to as connectable when a disengageable rotationally fixed connection exists between these elements. When the connection is engaged, such elements rotate with the same rotational speed.

An electrical machine or motor consists of at least one rotationally fixed stator and a rotating rotor, and is arranged in motor mode to convert electrical energy into mechanical energy in the form of rotational speed and torque, and in generator mode to convert mechanical energy into electrical energy in the form of electricity and voltage.

A gear set plane refers to a plane in which the ring gear, carrier, and sun gear of one or several planetary gear sets are arranged. The elements do not have to be arranged mirror-symmetrically along this plane. The term gear set plane must rather be understood as a construction space plane that denotes the location of one or several planetary gear sets in the transmission.

When the fourth interface shaft is connected to an electrical machine, the transmission system according to the invention is a hybrid transmission through which the electrical machine is connected to the power flow of the transmission with a so-called pre-transmission internal to the transmission system. This has the advantage that the electrical machine is configurable with small outside dimensions and is cost-effective.

Additionally, the electrical machine is usable to operate a vehicle in a reverse travel direction when a drive machine, preferably a combustion engine, coupled with the transmission input shaft is decoupled from the transmission input shaft by a disconnect clutch.

In a further transmission system according to the invention characterized by high functional density, the sixth interface shaft is connectable to a housing-mated component by an additional shift element, whereas the fourth interface shaft is connected to an electrical machine. On this embodiment, the transmission system according to the invention is a hybrid transmission, wherein two mechanical gear ratios for reverse travel are producible in addition to the six gear ratios for forward travel.

If the planetary gear sets are minus planetary gear sets, the sun gears are the first planetary gear set shafts of the planetary gear sets, the carriers are the second planetary gear set shafts of the planetary gear sets, and the ring gears are the third planetary gear set shafts of the planetary gear sets in order to make the transmission system according to the invention available with low transmission losses, high gear meshing efficiencies, a favorable range of gear ratios, and low component loads.

In contrast to this, if the planetary gear sets are plus planetary gear sets, the first planetary gear set shafts of the planetary gear sets are the sun gears, the second planetary gear set shafts of the planetary gear sets are the ring gears, and the third planetary gear set shafts of the planetary gear sets are the carriers in order to have the ability to operate the transmission system according to the invention with good gear efficiencies and the resulting low transmission losses and at the same time low component loads, and to form a favorable range of gear ratios.

When the shift element connecting the fifth interface shaft to the housing-mated component and/or the shift element connecting the sixth interface shaft to the housing-mated component are form-locking shift elements or dog clutches, the power losses in the transmission system according to the invention are further reduced compared to a configuration of these shift elements as friction-locking shift elements. This is caused by undesirably high slip losses that occur on friction-locking shift elements in opened working condition, which reduces the overall efficiency.

When the transmission input shaft is disconnectable by an additional shift element upstream in the power flow of the shift elements by which the transmission input shaft is connectable to the sixth interface shaft and the seventh interface shaft, a drive machine of a vehicle powertrain coupled with the transmission input shaft, e.g. the drive machine being a combustion engine, in a straightforward design is decouplable in various operating states of a vehicle. As a result, the vehicle is operable at high efficiency in coasting mode while the drive machine is switched off.

When at least some of the shift elements, preferably all shift elements, are friction locking shift elements, gear ratio changes between the individual gear ratios for forward and reverse travel are, without additional design steps, at least partially rendered as gear changes free of tractive effort interruptions, or a vehicle arranged with a transmission system according to the invention can be accelerated from a full stop without an additional element for accelerating from a full stop, such as a friction locking clutch or a hydrodynamic torque converter.

If the second planetary gear set and the third planetary gear set are in one planetary gear plane and the second planetary gear set is arranged radially within the third planetary gear set, the transmission system according to the invention has a low installation space requirement in the axial direction.

With a further embodiment of the transmission system according to the invention having a low installation space requirement in the radial direction, the second planetary gear set is arranged in the axial direction in a gear set plane between the gear set plane of the first planetary gear set and the gear set plane of the third planetary gear set.

In further advantageous embodiments of the transmission system according to the invention, at least some of the shift elements are shape-locking and/or friction-locking shift elements, wherein friction-locking shift elements are advantageous as elements for accelerating from a full stop and/or to perform so-called power shifts free of tractive force interruptions between individual gear ratios of the transmission system according to the invention. Clutches and/or brakes arranged as shape-locking shift elements, such as jaw-type shift elements, have low power losses in the open working condition compared to friction-locking shift elements.

The transmission system is, with straightforward design effort, installable in the respectively desired scope in a vehicle in a longitudinal arrangement or in a front-transverse arrangement when the shift elements are at least partially arranged in axial direction between the gear set planes of the first planetary gear set and the second planetary gear set.

The transmission system according to the invention is preferably a component of a hybrid powertrain of a motor vehicle. In addition to the transmission system, the hybrid powertrain also features a drive machine, the drive machine being a combustion engine that is directly connected, and/or is connectable with, the transmission input shaft of the transmission by a clutch. The motor vehicle is drivable both by the combustion engine and by the electrical machine of the transmission system. For this purpose, the transmission system optionally features a further electrical machine that is arranged to output a torque via its rotor to the transmission input shaft, and to start the combustion engine in this manner. This has the advantage that the combustion engine can be started by the additional electrical machine, without influencing a simultaneous driving mode during which the motor vehicle is solely driven by the electrical machine of the transmission system.

The electrical machine is connected to an inverter by which the electrical machine is connected to an energy storage device. Any form of energy storage device is suited for this purpose, in particular electrochemical, electrostatic, hydraulic, and mechanical energy storage devices.

In addition, the option exists to use the transmission system according to the invention in a powertrain of an electrical vehicle. Such an electrical vehicle is drivable by one or several electrical machines, and accordingly features no combustion engine. For such a use, a so-called traction electrical machine is used through the transmission input shaft. Due to the various gear ratio levels of the transmission system, the traction electrical machine is operable at high efficiency, thus improving the energy efficiency of the entire electrical vehicle.

BRIEF DESCRIPTION OF THE DRAWINGS

Other advantages and advantageous embodiments of the transmission system in accordance with the invention will become apparent from the patent claims and the exemplary embodiments, which, in principle, are described below with reference to the drawings, where for the sake of clarity the same reference numerals and characters are used for those components that are structurally and functionally the same, in the description of the various exemplary embodiments. The following is shown:

FIG. 3 is a gear shift diagram of the transmission system according to FIG. 1 and/or FIG. 2;

FIG. 14 is a gear shift diagram of the embodiments of the transmission system in accordance with the invention in accordance with FIG. 10 through FIG. 13.

DETAILED DESCRIPTION

Figure 1:
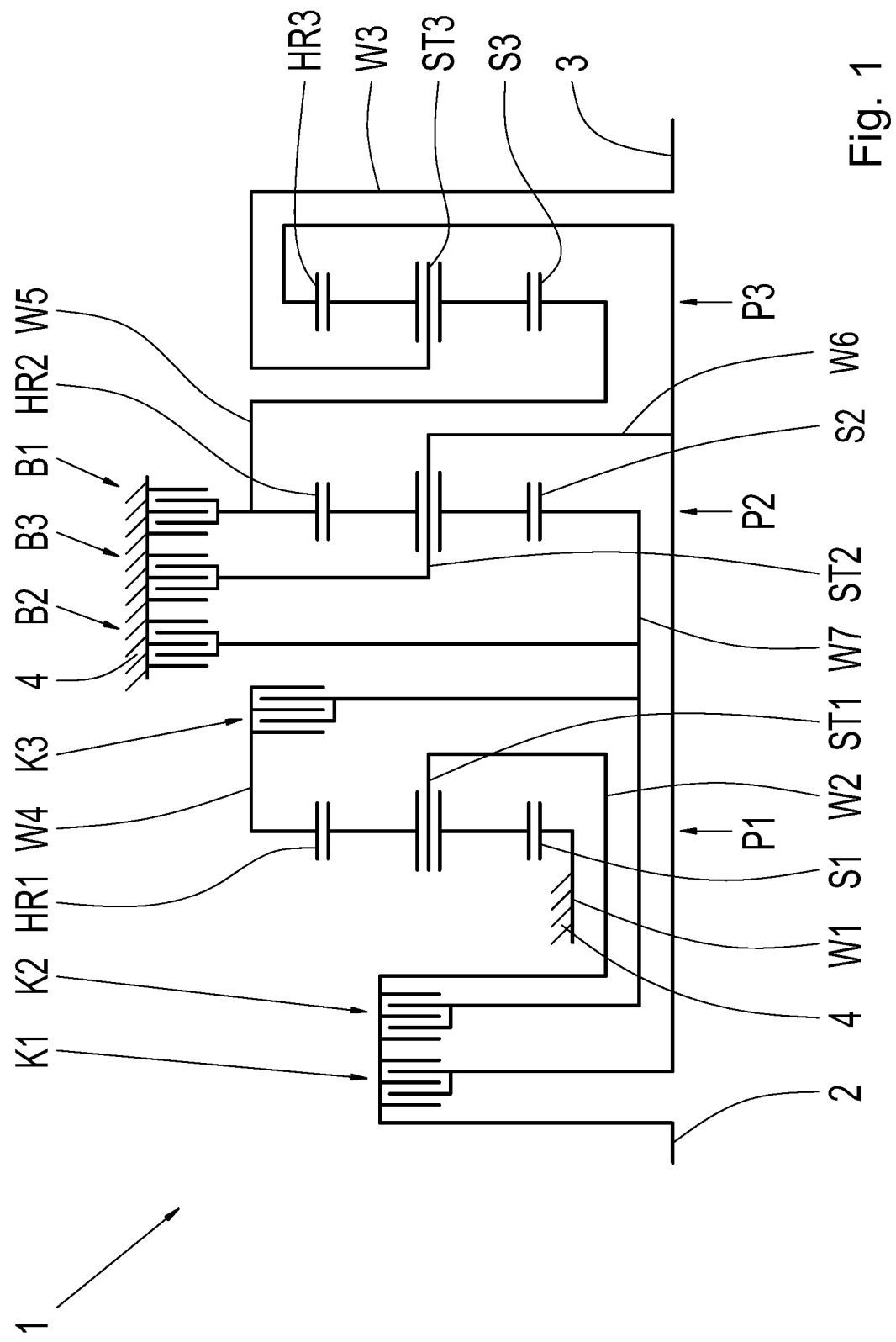
FIG. 1 is a gearbox diagram of a first embodiment of the transmission system in accordance with the invention with three planetary gear sets that are arranged side-by-side in axial direction.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a first embodiment of a transmission system 1 with a transmission input shaft 2, a transmission output shaft 3 and three planetary gear sets P1 to P3 having a total of seven interface shafts W1 to W7. For purposes of representing at least six gear ratios 1VM to 6VM, during which the transmission input shaft 2 and the transmission output shaft 3 revolve with the same or different direction of rotation, which represent so-called gear ratios for forward travel when the transmission system 1 is used in a vehicle, the planetary gear sets P1 to P3 are at least partially functionally connected to each other in the area of the planetary gear set shafts S1, ST1, HR1, S2, ST2, HR2, S3, ST3 and HR3 of the planetary gear sets P1 to P3, are at least partially connectable to each other with shift elements K1, K2, K3, B1, B2, and B3 and coupled to the interface shafts W1 to W7 in the area of the planetary gear set shafts S1 to HR3.

Figure 2:
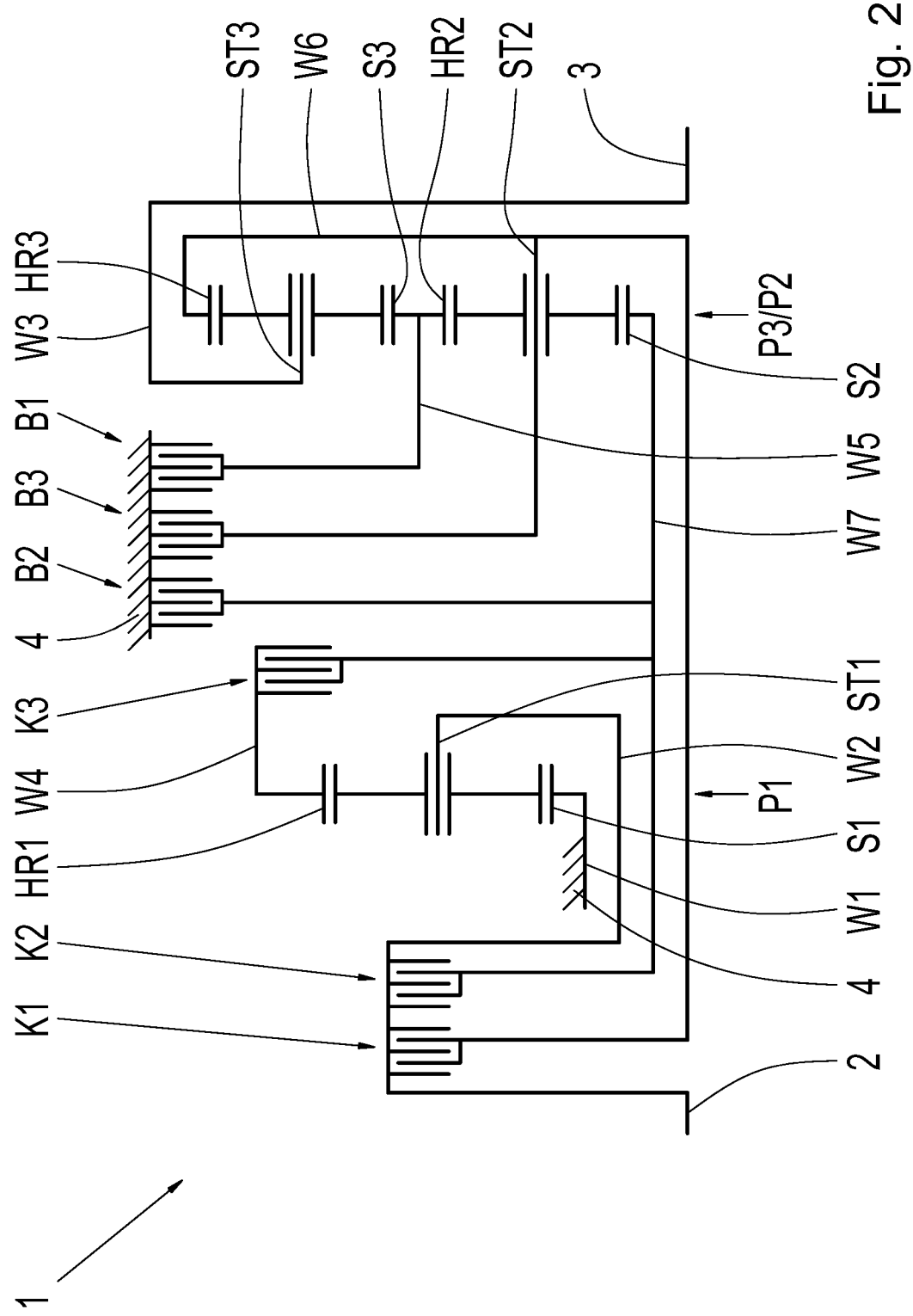
FIG. 2 is a view corresponding to that in FIG. 1 of a second embodiment of the transmission system in accordance with the invention with two radially nested planetary gear sets.

FIG. 2 shows a second embodiment of the transmission system 1 that essentially differs from the transmission system 1 shown in FIG. 1 in that the planetary gear set P3 is radially nested inside the first planetary gear set and in that the two planetary gear sets P2 and P3 are positioned in the same gear set plane. As a result, the transmission system 1 shown in FIG. 2 has a lower installation space requirement in axial direction than the transmission system 1 shown in FIG. 1.

FIG. 3 shows a shift diagram of the transmission system 1 shown in FIG. 1 and FIG. 2, along with the embodiments of the transmission system 1 shown in FIG. 4 to FIG. 9, wherein the shift diagram shown in FIG. 3, for the purpose of representing a defined working condition of the transmission system 1, shows each of the shift elements B1 to K3 that represent a closed working condition as marked by the letter X. The shift elements B1 to K3 are all arranged as friction-locking shift elements. All embodiments of the transmission system 1 shown in the drawing can each represent six gear ratios 1VM to 6VM for forward travel between the transmission input shaft 2 and the transmission output shaft 3, during which the transmission input shaft 2 and the transmission output shaft 3 revolve with the same or different direction of rotation. In addition to the exemplary embodiments of the transmission system 1 shown in FIG. 1, FIG. 2, and FIG. 4 to FIG. 9 with the shift element B3 being a brake, the two gear ratios R1VM and R2VM can be additionally represented for reverse travel.

A first forward gear 1VM between the transmission input shaft 2 and the transmission output shaft 3 is configured by closing the shift element B1 being a brake and the further shift element K2 being a clutch. A second forward gear 2VM is engaged in the transmission system 1 when the shift element B1 and the shift element K3 being a clutch are closed simultaneously. The third forward gear 3VM is then engaged in the transmission system when the shift element B1 and the further shift element K1 being a clutch are closed. The fourth forward gear 4VM is represented in the transmission system 1 when the shift element K1 and the shift element K3 are closed simultaneously in the transmission system 1. For a corresponding request to engage the fifth forward gear 5VM, the shift element K1 and the shift element K2 must be moved to the closed working condition. The sixth forward gear 6VM is in turn engaged in the transmission system 1 when the shift element B2 and K1 are simultaneously in the closed working condition.

When the transmission system 1 shown in FIG. 1, FIG. 2, or FIG. 4 to FIG. 9 is to be used for reverse travel, either the shift elements B3 and K2 or the shift elements B3 and K3 must either be simultaneously held or moved into the closed working condition.

The further exemplary embodiments of the transmission system 1 shown in FIG. 10 to FIG. 13 are arranged without the friction-locking brake B3, which is why the two gear ratios R1VM and R2VM for reverse travel cannot be represented in the transmission systems 1 shown in FIG. 10 to FIG. 13 and are therefore not shown for these transmission systems 1 in the shift diagram shown in FIG. 14. For reverse travel, the shift diagram shown in FIG. 14 for the gear ratios 1VM to 6VM otherwise corresponds to the shift diagram shown in FIG. 3, which is why reference is made to the description above for purposes of representing the individual gear ratios 1VM to 6VM in the transmission systems 1 shown in FIG. 10 to FIG. 13.

The exemplary embodiments of the transmission system 1 shown in the drawing feature the transmission structure described in detail below and each differ in that certain of the exemplary embodiments of the transmission system 1 are arranged with an additional electrical machine or in that the gear sets are installed axially in various configurations side-by-side or partially inside each other and/or nested.

In all embodiments of the transmission system 1, the first interface shaft W1 is respectively connected rotationally fixedly to the first planetary gear set shaft S1 of the first planetary gear set P1 and to a housing-mated component 4, whereas the second interface shaft W2 is connected to the transmission input shaft 2 and to the second planetary gear set shaft ST1 of the first planetary gear set P1. The third interface shaft W3 is respectively connected to the transmission output shaft 3 and to the second planetary gear set shaft ST3 of the third planetary gear set P3. Furthermore, the fourth interface shaft W4 is connected to the fourth planetary gear set shaft HR1 of the first planetary gear set P1 and is connectable to the seventh interface shaft W7 with the shift element K3. The fifth interface shaft W5 is in turn connected to the third planetary gear set shaft HR2 of the second planetary gear set P1 and to the first planetary gear set shaft S3 of the third planetary gear set P3 and is connectable to the housing-mated component 4 with shift element B1. Furthermore, the sixth interface shaft W6 is connected to the third planetary gear set shaft HR3 of the third planetary gear set P3 and to the second planetary gear set shaft ST2 of the second planetary gear set P2 and is connectable to the transmission input shaft 2 with the shift element K1, whereas the seventh interface shaft W7 is connected to the first planetary gear set shaft S2 of the second planetary gear set P2 and is connectable via shift element B2 to the housing-mated component 4 and to the interface input shaft 2 via shift element K2.

The planetary gear sets P1 to P3 of all embodiments of the transmission system 1 shown in the drawings may be minus planetary gear sets, which is why each first planetary gear set shaft of the planetary gear sets P1 to P3 is a sun gear S1 to S3, whereas each second planetary gear set shaft of the planetary gear sets P1 to P3 is a carrier ST1 to ST3, and each third planetary gear set shaft of the planetary gear sets P1 to P3 is a ring gear HR1 to HR3.

In contrast to this, each first planet gear set shaft of the planetary gear sets is a sun gear, each second planetary gear set shaft is a ring gear, and each third planetary gear set shaft is a carrier when the planetary gear set shafts are plus planetary gear sets.

In the embodiments of the transmission system 1 shown in FIG. 1 and FIG. 2, the two shift elements K1 and K2 are arranged on the transmission input side. The gear set plane of the first planetary gear set P1 includes the two shift elements K1 and K2 in the axial direction. In the embodiment of the transmission system 1 shown in FIG. 1, the gear set plane of the second planetary gear set P2 is arranged between the gear set plane of the first planetary gear set P1 and the gear set plane of the third planetary gear set P3, wherein the third planetary gear set P3 is positioned on the transmission output side. Furthermore, the shift elements B1 to B3 and the shift element K3 are axially arranged between the gear set plane of the first planetary gear set P1 and the gear set plane of the second planetary gear set P2, which permits a straightforward design of a coaxial configuration of the transmission input shaft 2 and the transmission output shaft 3.

In contrast to the embodiment of the transmission system 1 shown in FIG. 1, the second planetary gear set 2 and the third planetary gear set P3 of FIG. 2 are arranged in a common gear set plane, wherein the second planetary gear set P2 is radially nested inside the third planetary gear set P3. Irrespective of the arrangement of the second planetary gear set P2 and the third planetary gear set P3, the transmission output shaft 3 of the transmission system 1 shown in FIG. 2 is also arranged coaxially to the transmission input shaft 2, in which case the transmission systems 1 shown in FIG. 1 and FIG. 2 are preferably intended for a longitudinal configuration in a motor vehicle.

Figure 4:
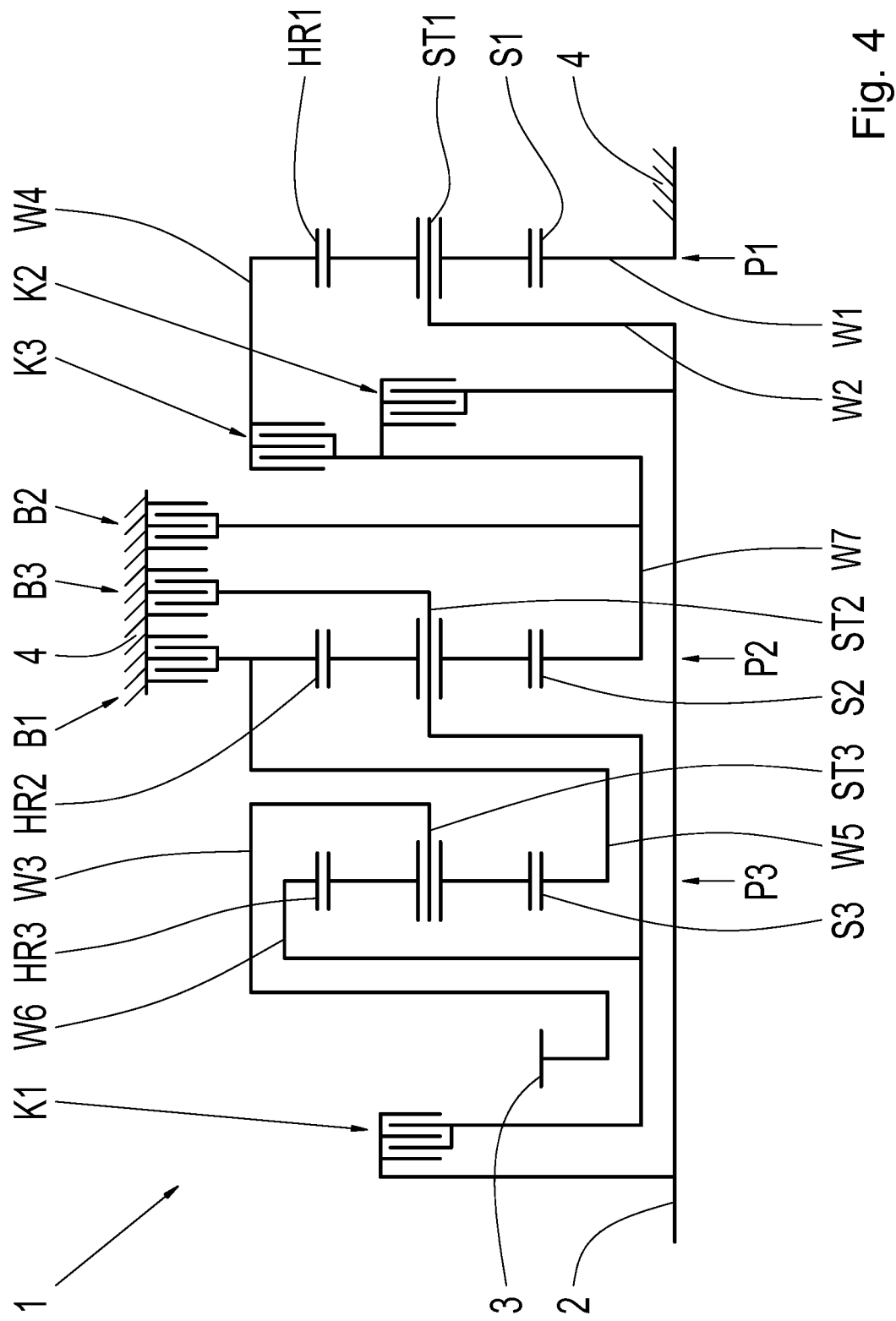
FIG. 4 is a view corresponding to that in FIG. 1 of a third embodiment of the transmission system in accordance with the invention.
Figure 5:
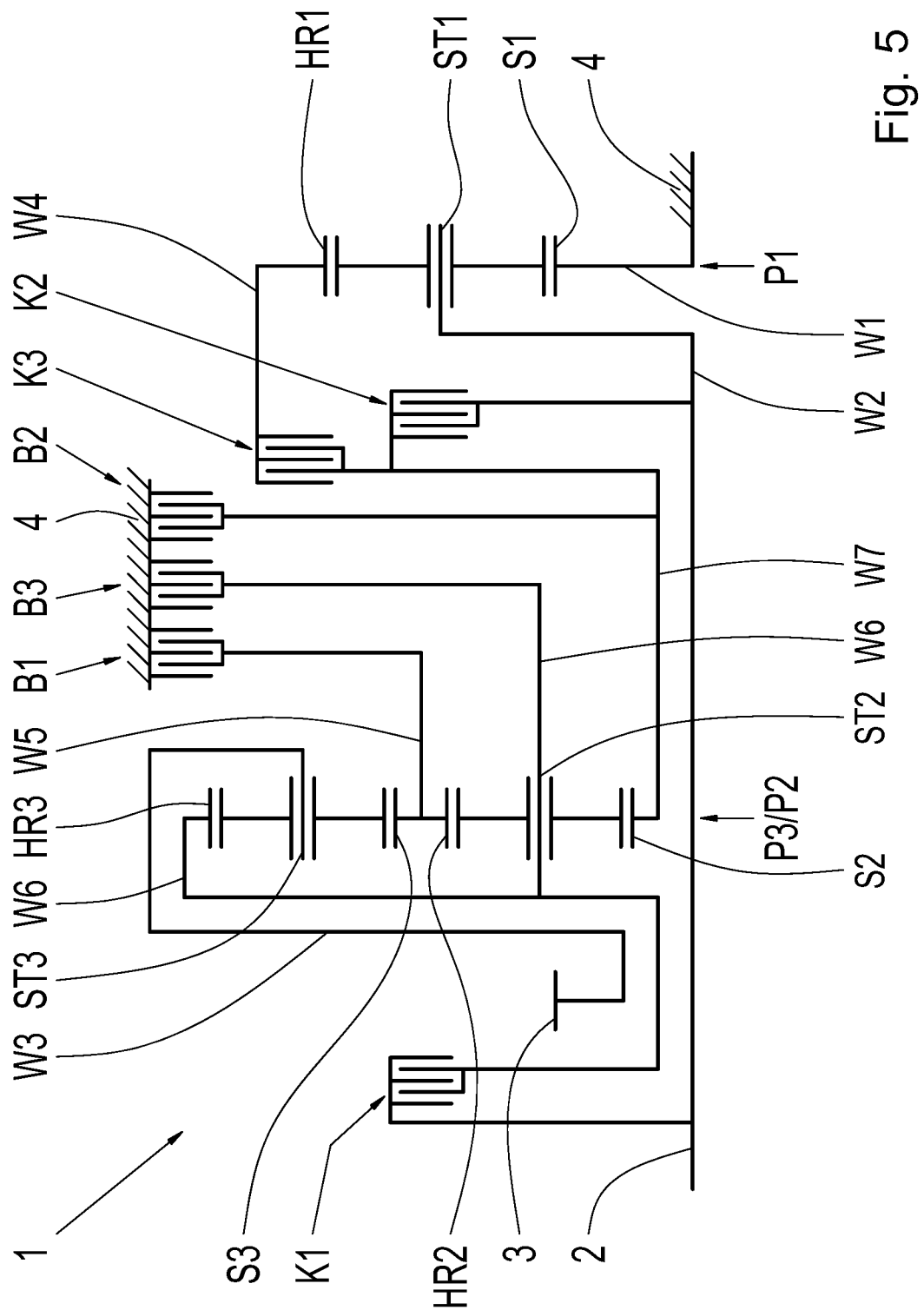
FIG. 5 is a view essentially corresponding to that of FIG. 2 showing a fourth embodiment of the transmission system in accordance with the invention.

In the embodiments of the transmission system 1 shown in FIG. 4 and FIG. 5, the transmission output is arranged laterally, which is why these embodiments of the transmission system 1 are preferably used in a so-called front-transverse arrangement in a vehicle.

In the transmission systems 1 shown in FIG. 4 and FIG. 5, only the shift element K1 is positioned on the transmission input side, whereas the shift elements B1 to B3 and the shift elements K1 and K3 are arranged between the planetary gear set P1, which is respectively arranged on the transmission output side, and the second planetary gear set P2, or between the first planetary gear set P1 and the two planetary gear sets P2 and P3, the two planetary gear sets P2 and P3 being in the nested arrangement shown in FIG. 5.

The further exemplary embodiments of transmission system shown in FIG. 6 to FIG. 9 each additionally include an electrical machine 5 whose stator 6 is connected to the housing-mated component 4 and whose rotor 7 is connected to the fourth interface shaft W4. The embodiments of the transmission system 1 shown in FIG. 6 to FIG. 9 then represent so-called hybrid drives in which the electrical machine 5 and/or its rotor 7 are each integrated into the power flow of the transmission system 1 through the first planetary gear set P1 via a pre-transmission internal to the transmission. By integrating the electrical machine 5 via the pre-transmission internal to the transmission, the electrical machine 5 is therefore smaller and thus manufacturable at a lower cost compared to an electrical machine mated directly into the power flow and/or to the transmission input shaft 2.

In addition, yet another shift element K0 and/or a disconnect shift element is arranged in the area of the transmission input shaft 2, the shift element K0 being a friction-locking clutch. A drive machine, e.g. a combustion engine, is functionally connected to the transmission input shaft 2 by the disconnect shift element K0 and can be decoupled from the transmission input of the transmission system 1 shown in FIG. 6 to FIG. 9 in order to, for instance, have the ability to decouple a purely electrical driving mode while operating the electrical machine 5 in motor mode. In addition, the option exists to decouple such a drive machine in the area of the disconnect shift element K0 in order to fully employ a torque applied in the area of the transmission output shaft 3 for driving the electrical machine 5 when operated in generator mode, and to then generate electrical energy with high efficiency in the area of the electrical machine 5.

Figure 6:
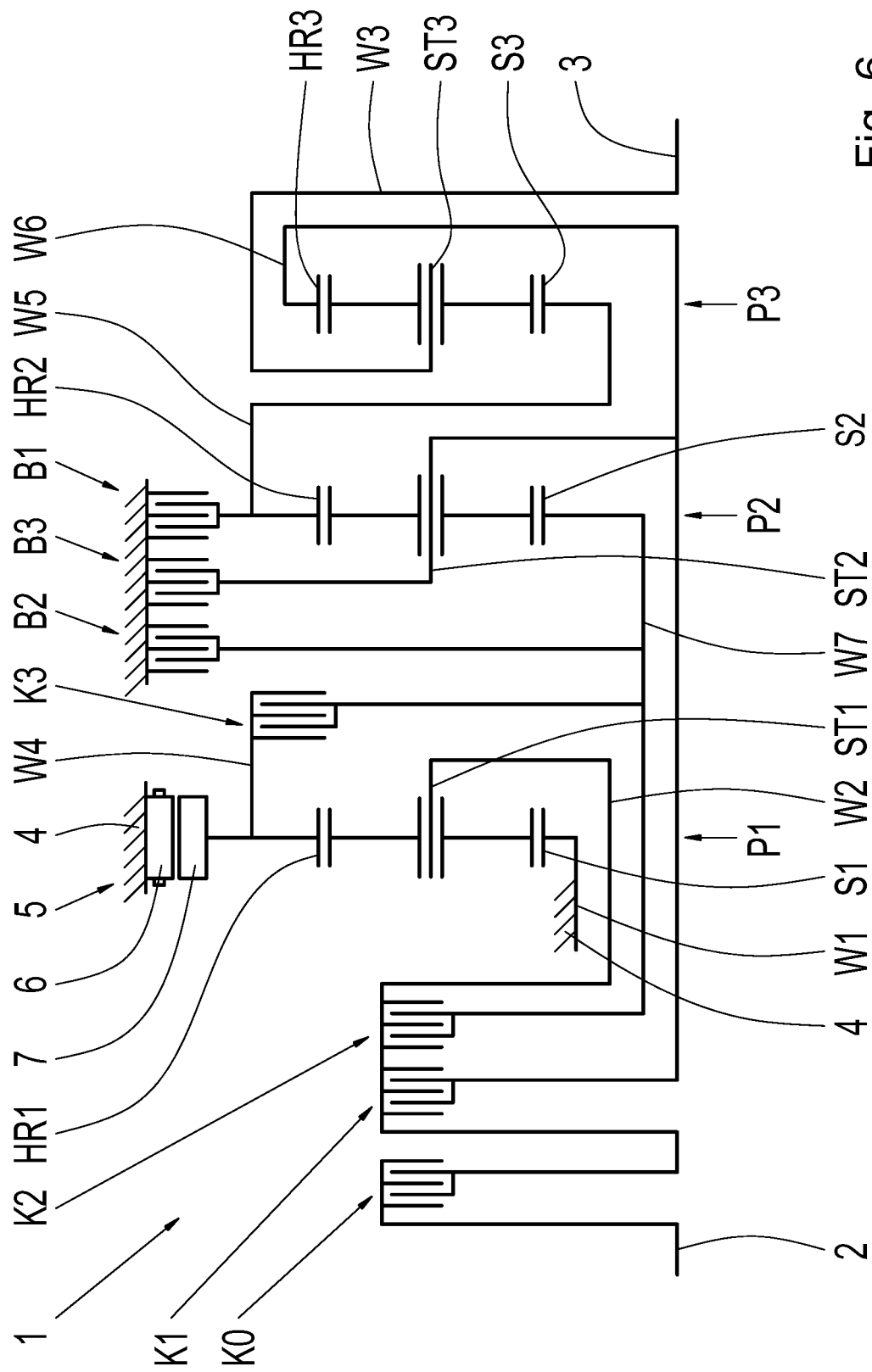
FIG. 6 is a view corresponding to that of FIG. 1 showing a fifth embodiment of the transmission system in accordance with the invention with a disconnect shift element arranged in the area of the transmission input shaft.
Figure 7:
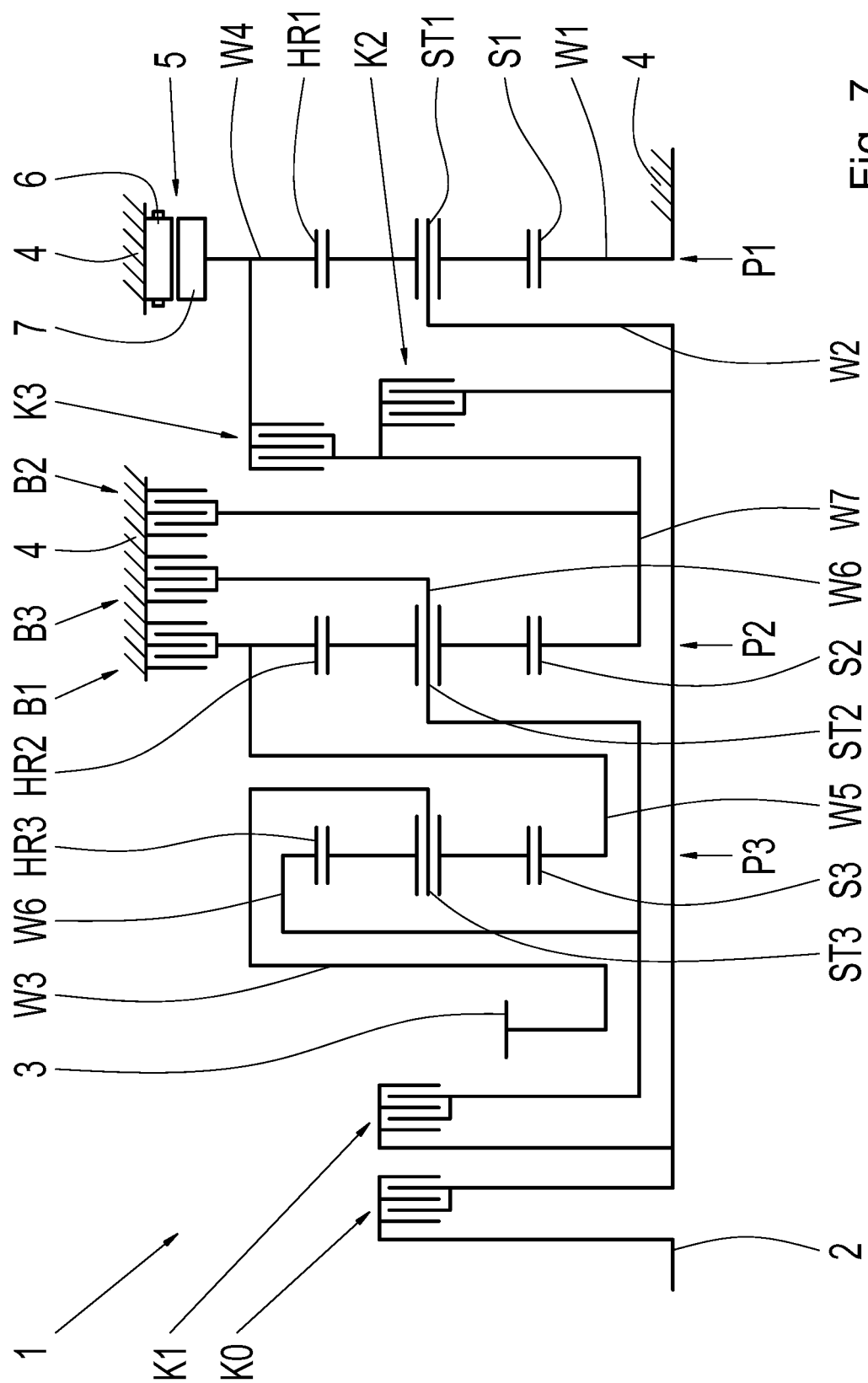
FIG. 7 is a view corresponding to that in FIG. 6 of a sixth embodiment of the transmission system in accordance with the invention.
Figure 8:
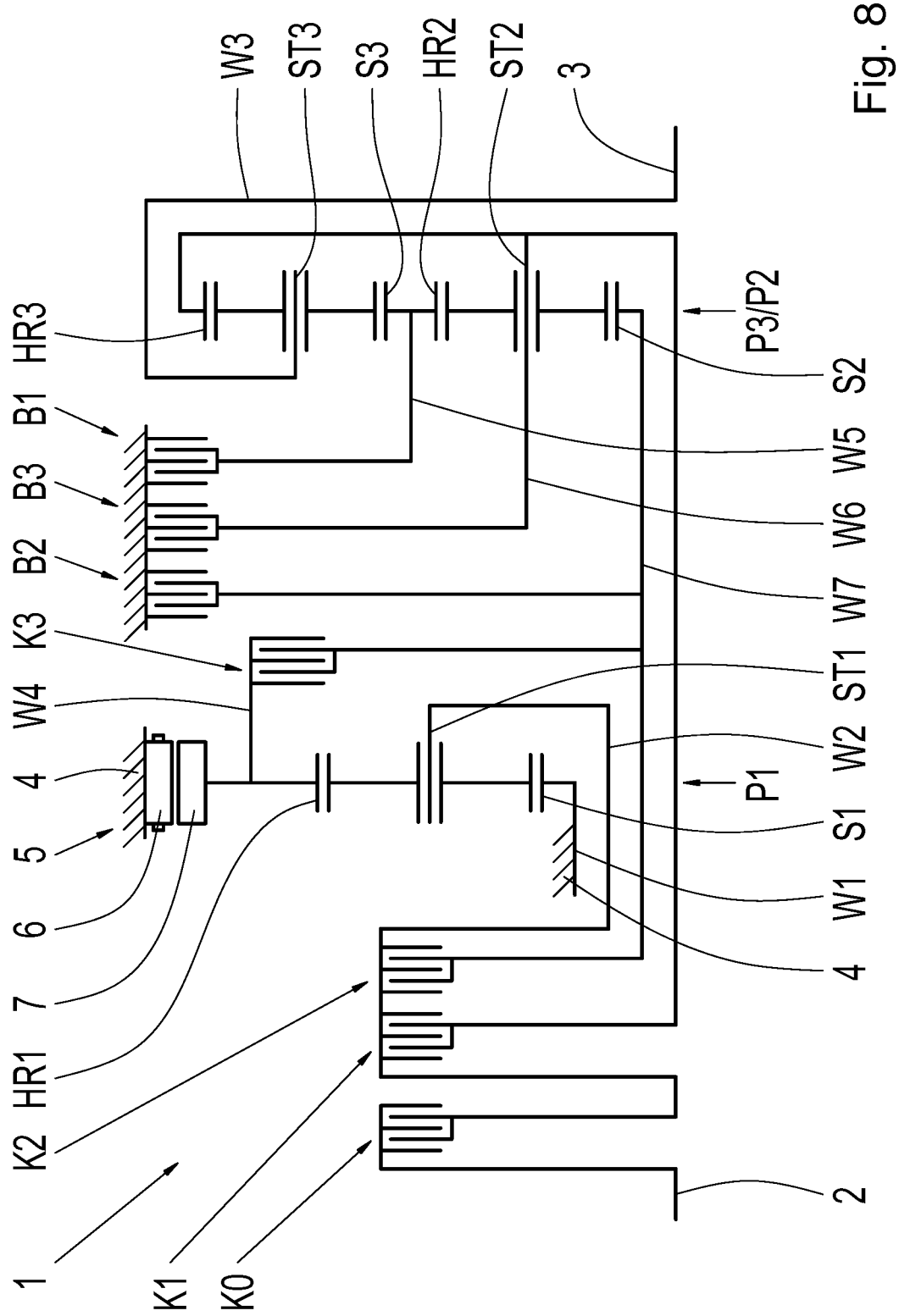
FIG. 8 is a view corresponding to that in FIG. 6 of a seventh embodiment of the transmission system with two nested planetary gear sets.
Figure 9:
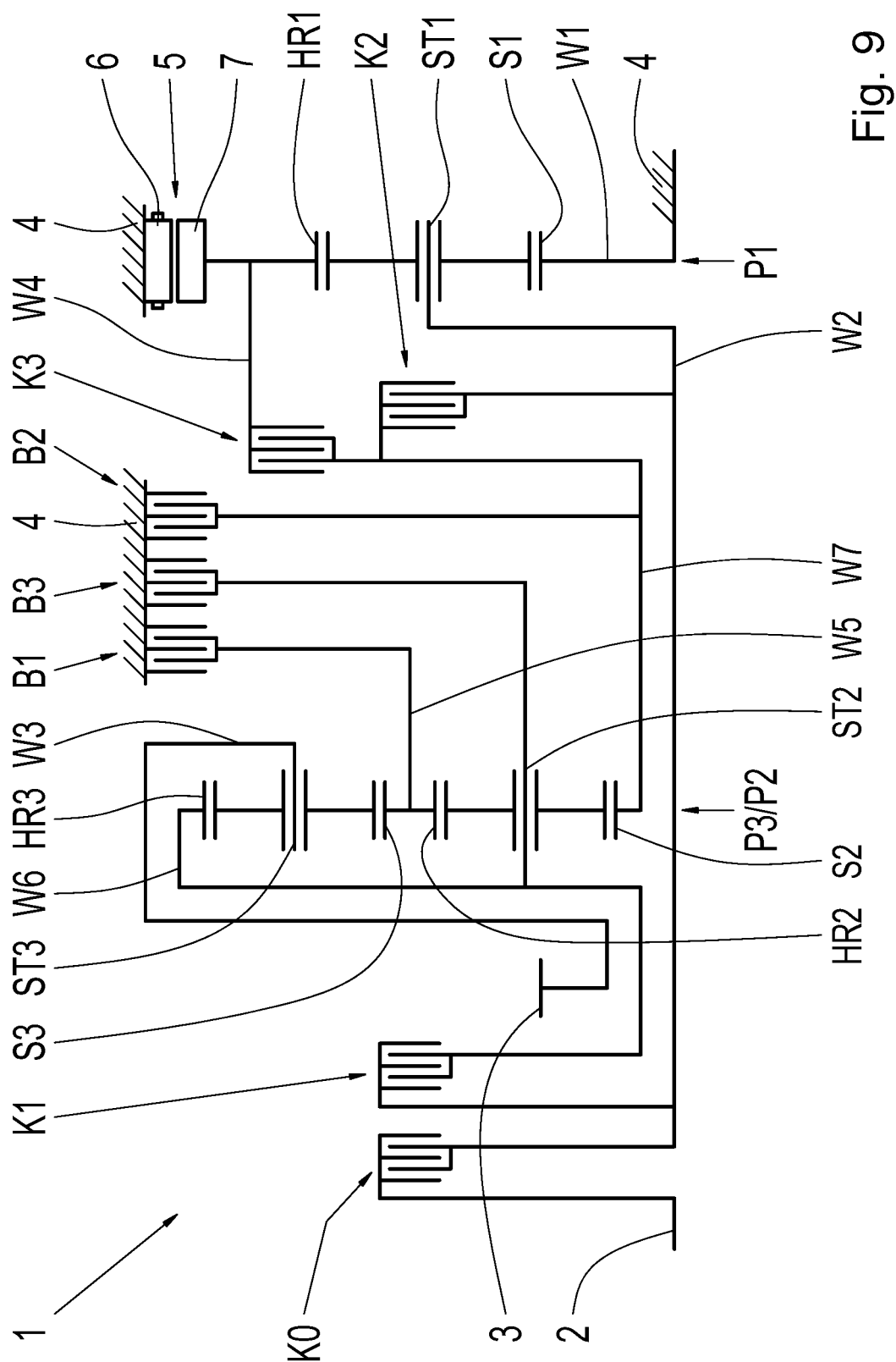
FIG. 9 is a view corresponding to that in FIG. 8 of an eighth embodiment of the transmission system in accordance the invention with two radially nested planetary gear sets.

The transmission structure the transmission system 1 shown in FIG. 6 otherwise corresponds to the transmission structure of the transmission system 1 shown in FIG. 1, and the transmission structure of the transmission system 1 shown in FIG. 7 otherwise corresponds to the transmission structure of the transmission system 1 shown in FIG. 4. Other than the previously described connection of the electrical machine 5 to the fourth interface shaft W4, the transmission system 1 shown in FIG. 8 also has the same structure as the transmission system 1 shown in FIG. 2. The transmission system 1 shown in FIG. 9 additionally has the previously described structure of the transmission system 1 shown in FIG. 5, which is why reference is made to the previous descriptions in FIG. 1 to FIG. 5 regarding the functionality of the transmission system 1 shown in FIG. 6 to FIG. 9.

The further exemplary embodiments of the transmission system 1 shown in FIG. 10 to FIG. 13 are each arranged with the electrical machine 5 in the same scope as the transmission system 1 shown in FIG. 1 to FIG. 9. In order to operate a vehicle equipped with the transmission system 1 shown in FIG. 10 to FIG. 13 in the reverse travel direction, the direction of rotation of the electrical machine 5 is arranged accordingly and the transmission output shaft 3 is operated with a direction of rotation required for representing reverse travel mode.

Figure 10:
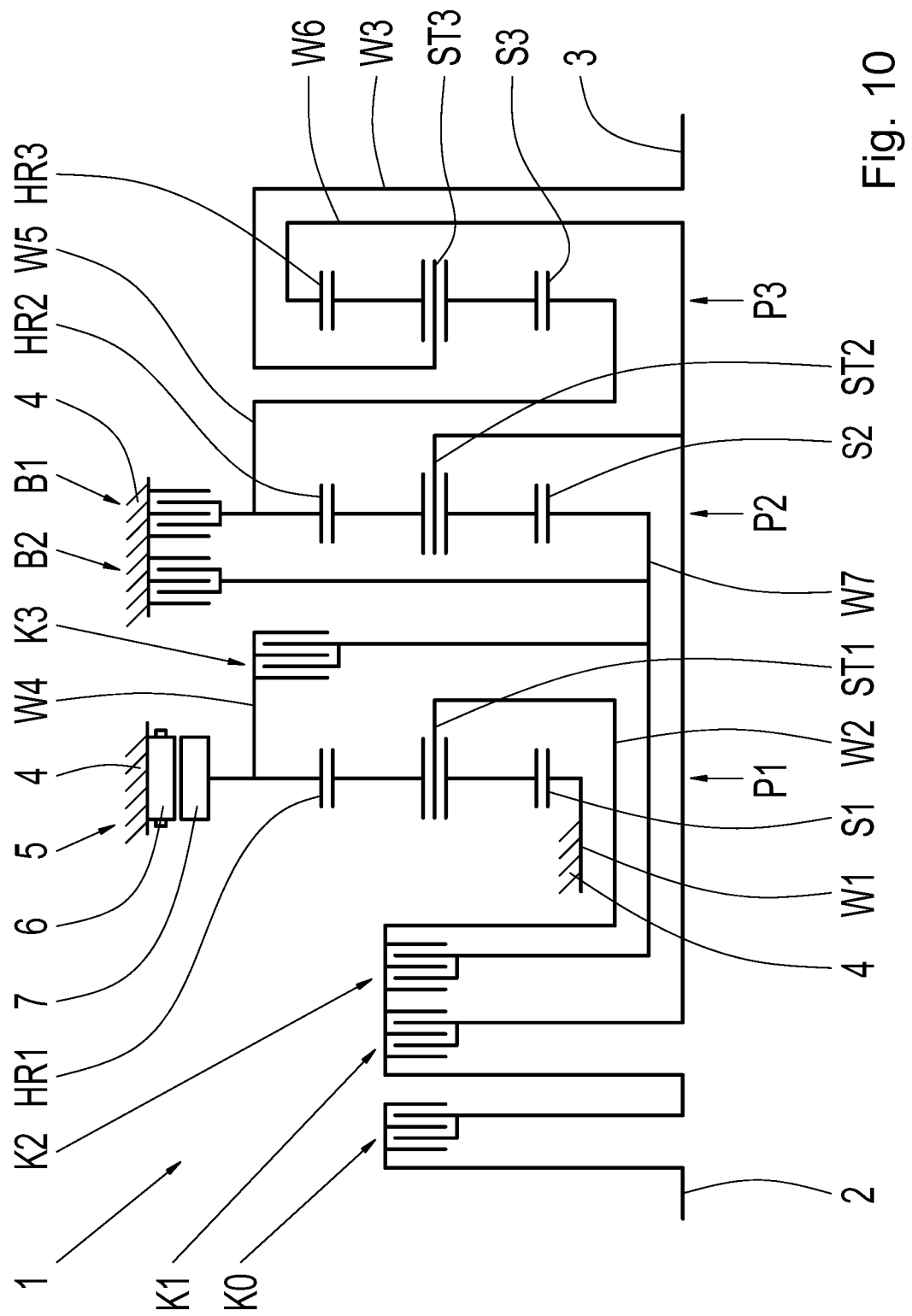
FIG. 10 is a gearbox diagram of a ninth embodiment of the transmission system in accordance the invention with an electrical machine with merely five shift elements and a disconnect shift element in the area of the transmission system.
Figure 11:
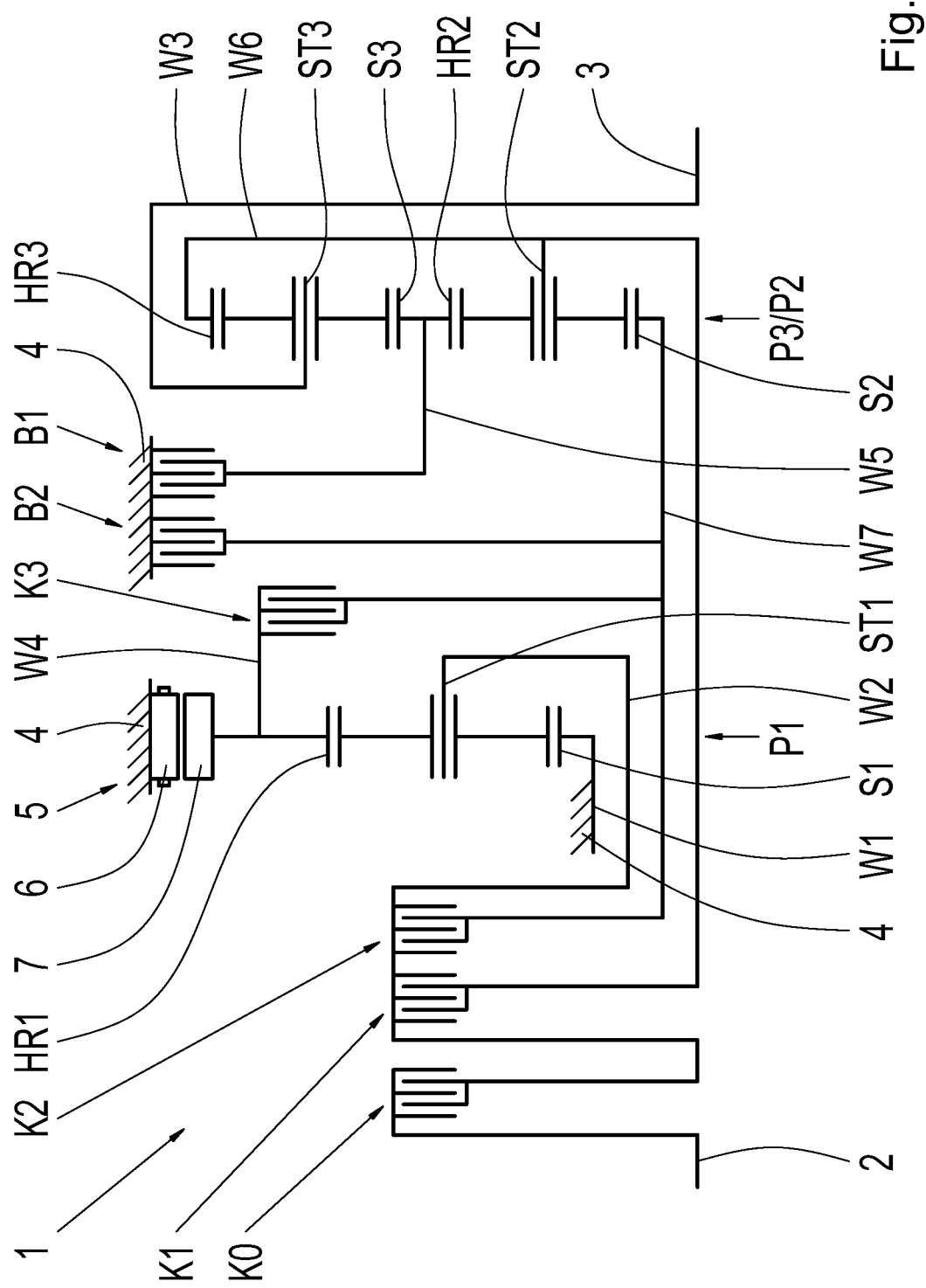
FIG. 11 is a view corresponding to that in FIG. 10 of a tenth embodiment of the transmission system in accordance the invention with two radially nested planetary gear sets.
Figure 12:
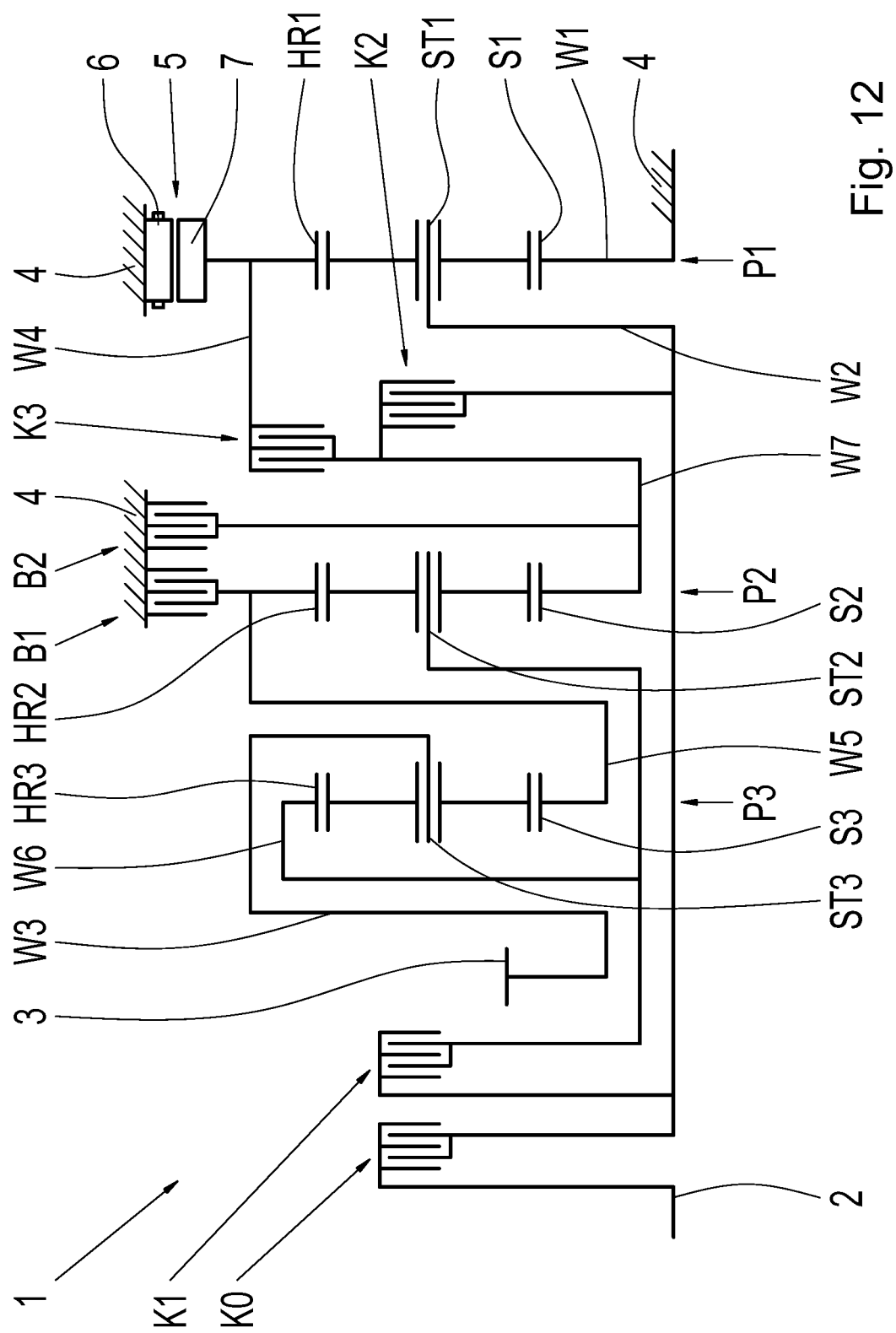
FIG. 12 is a view corresponding to that in FIG. 10 of an eleventh embodiment of the transmission system in accordance with the invention.
Figure 13:
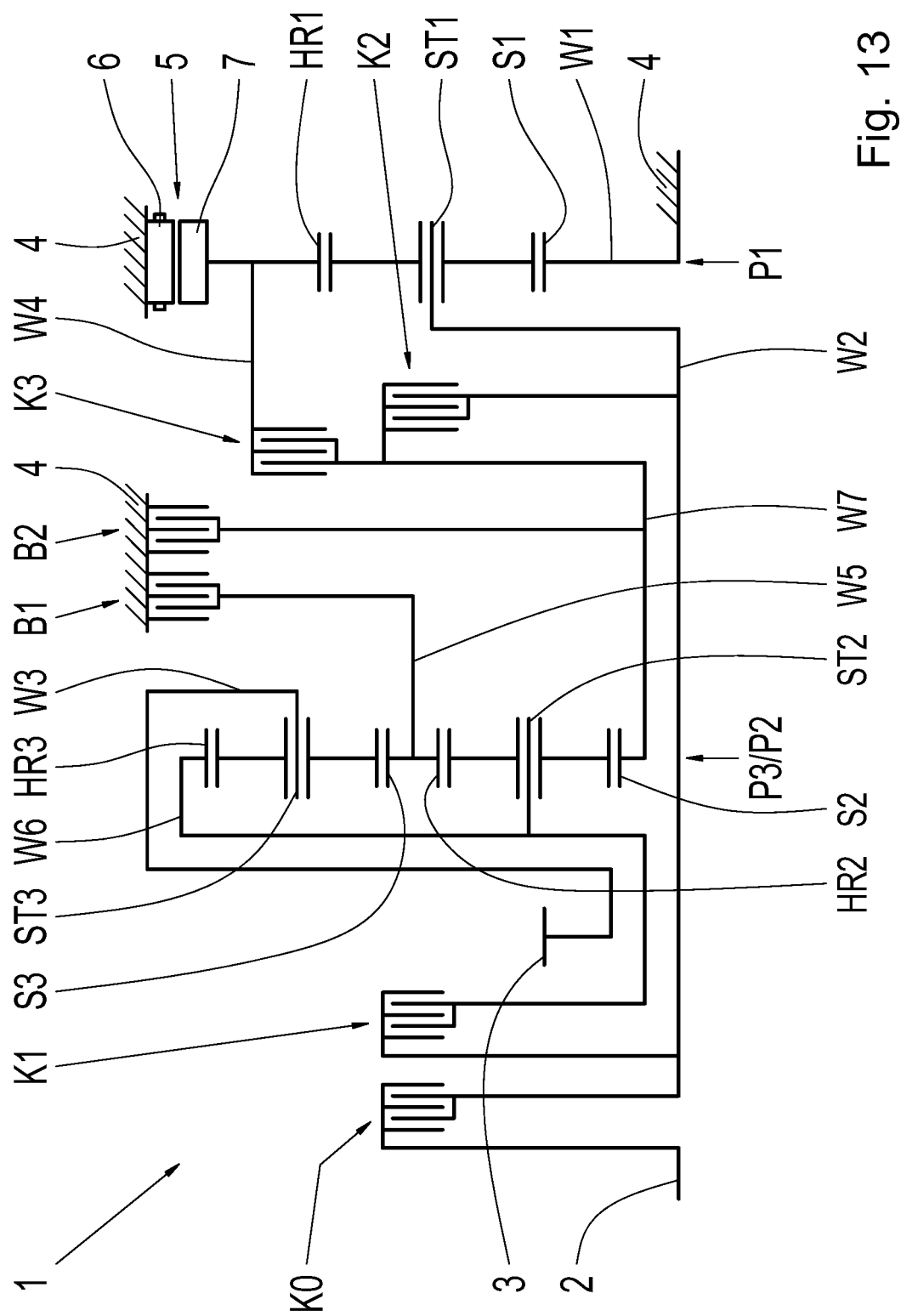
FIG. 13 is a view corresponding to that in FIG. 12 of a twelfth embodiment of the transmission system in accordance the invention with two radially nested planetary gear sets.

The transmission system 1 shown in FIG. 10 otherwise has a transmission structure corresponding to the transmission structure of the transmission system 1 shown in FIG. 1, whereas the transmission structures of the transmission systems 1 shown in FIG. 11, FIG. 12, and FIG. 13 each correspond to the transmission structures of the transmission system 1 shown in FIG. 2, FIG. 4, and FIG. 5, which is why reference is made to the above description for FIG. 1 and FIG. 2 and/or FIG. 4 and FIG. 5 regarding the further functionality of the transmission systems 1 shown in FIG. 10 to FIG. 13.

Modifications and variations can be made to the embodiments illustrated or described herein without departing from the scope and spirit of the invention as set forth in the appended claims.

REFERENCE SIGNS

1 Transmission system
2 Transmission input shaft
3 Transmission output shaft
4 Housing-mated component
5 Electrical machine
6 Stator
7 Rotor
B1-B3 Shift element
HR1-HR3 Planetary gear set shaft, ring gear
K0-K3 Shift element
P1-P3 Planetary gear set
ST1-ST3 Planetary gear set shaft, carrier
S1-S3 Planetary gear set shaft, sun gear
W1-W7 Interface shaft

The invention claimed is:
1. A transmission system (1), comprising:
a transmission input shaft (2);
a transmission output shaft (3); and first, second and third planetary gear sets (P1, P2, P3) having a total of seven interface shafts (W1-W7), wherein the first, second and third planetary gear sets (P1, P2, P3) are at least partially functionally connected to each other through planetary gear set shafts (S1-HR3), are at least partially connectable to each other through a plurality of shift elements (B1, B2, K1-K3; B1-B3, K1-K3), and are coupled to the seven interface shafts (W1-W7) by the planetary gear set shafts (S1-HR3) such that at least six gear ratios (1VM-6VM, R1VM, R2VM) are selectable in which the transmission input shaft (2) and the transmission output shaft (3) revolve with the same or different direction of rotation, wherein a first interface shaft (W1) of the seven interface shafts (W1-W7) is connected rotationally fixedly to a first planetary gear set shaft (S1) of the first planetary gear set (P1) and to a housing-mated component (4), wherein a second interface shaft (W2) of the seven interface shafts (W1-W7) is connected to the transmission input shaft (2) and to a second planetary gear set shaft (ST1) of the first planetary gear set (P1), wherein a third interface shaft (W3) of the seven interface shafts (W1-W7) is connected to the transmission output shaft (3) and to a second planetary gear set shaft (ST3) of the third planetary gear set (P3), wherein a fourth interface shaft (W4) of the seven interface shafts (W1-W7) is connected to a third planetary gear set shaft (HR1) of the first planetary gear set (P1) and is connectable to a seventh interface shaft (W7) of the seven interface shafts (W1-W7) with a shift element (K3) of the plurality of shift elements (B1, B2, K1-K3; B1-B3, K1-K3), wherein a fifth interface shaft (W5) of the seven interface shafts (W1-W7) is connected to a third planetary gear set shaft (HR2) of the second planetary gear set (P2) and to a first planetary gear set shaft (S3) of the third planetary gear set (P3) and is connectable to the housing-mated component (4) with one of the shift elements (B1) of the plurality of shift elements (B1, B2, K1-K3; B1-B3, K1-K3), wherein a sixth interface shaft (W6) of the seven interface shafts (W1-W7) is connected to a third planetary gear set shaft (HR3) of the third planetary gear set (P3) and to a second planetary gear set shaft (ST2) of the second planetary gear set (P2) and is connectable to the transmission input shaft (2) with another shift element (K1) of the plurality of shift elements (B1, B2, K1-K3; B1-B3, K1-K3), and wherein a seventh interface shaft (W7) of the seven interface shafts (W1-W7) is connected to a first planetary gear set shaft (S2) of the second planetary gear set (P2), is connectable to the housing-mated component (4) with another one of the shift elements (B2) of the plurality of shift elements (B1, B2, K1-K3; B1-B3, K1-K3), and is connectable to the transmission input shaft (2) with a further shift element (K2) of the plurality of shift elements (B1, B2, K1-K3; B1-B3, K1-K3).

2. The transmission system (1) according to claim 1, further comprising an additional shift element (B3), the sixth interface shaft (W6) of the seven interface shafts (W1-W7) being connectable to the housing-mated component (4) with the additional shift element (B3).

3. The transmission system (1) according to claim 2, wherein one or both of the one shift element (B1) selectively connecting the fifth interface shaft (W5) to the housing-mated component (4) and the additional shift element (B3) selectively connecting the sixth interface shaft (W6) to the housing-mated component (4) is a dog clutch.

4. The transmission system (1) according to claim 1, further comprising an electrical motor (5), the fourth interface shaft (W4) of the seven interface shafts (W1-W7) being connected to the electrical motor (5).

5. The transmission system (1) according to claim 1, wherein one or more of the first, second and third planetary gear sets (P1-P3) is a negative planetary gear set, each first planetary gear set shaft of the one or more negative planetary gear sets is a sun gear (S1-S3), each second planetary gear set shaft of the one or more negative planetary gear sets is a carrier (ST1-ST3), and each third planetary gear set shaft of the one or more negative planetary gear sets is a ring gear (HR1-HR3).

6. The transmission system (1) according to claim 1, wherein one or more of the first, second and third planetary gear sets (P1-P3) is a positive planetary gear set, each first planetary gear set shaft of the one or more positive planetary gear sets is a sun gear (S1-S3), each second planetary gear set shaft of the one or more positive planetary gear sets is a ring gear (HR1-HR3), and each third planetary gear set shaft of the one or more positive planetary gear sets is a carrier (ST1-ST3).

7. The transmission system (1) according to claim 1, further comprising a further additional shift element (K0), the transmission input shaft (2) being disconnectable from a power flow of the transmission system (1) by the further additional shift element (K0), the further additional shift element (K0) positioned upstream of the another shift element (K1) and the further shift element (K2) by which the transmission input shaft (2) is connectable to the sixth interface shaft (W6) and to the seventh interface shaft (W7).

8. The transmission system (1) according to claim 1, wherein one or more shift elements of the plurality of shift elements (B1-B3, K0-K3) is a friction-locking shift element.

9. The transmission system (1) according to claim 1, wherein the second planetary gear set (P2) and the third planetary gear set (P3) are arranged in a gear set plane, and the second planetary gear set (P2) is nested radially inside the third planetary gear set (P3).

10. The transmission system (1) according to claim 1, wherein the second planetary gear set (P2) is axially arranged in a gear set plane between a gear set plane of the first planetary gear set (P1) and a planetary gear set plane of the third planetary gear set (P3).

11. The transmission system (1) according to claim 1, wherein one or more shift elements of the plurality of shift elements (B1-B3, K0-K3) is axially arranged between a gear set plane of the first planetary gear set (P1) and a gear set plane of the second planetary gear set (P2).

* * * * *